United States Patent [19]
Rajagopalan

[11] Patent Number: 5,948,864
[45] Date of Patent: Sep. 7, 1999

[54] GOLF BALL INCORPORATING LIQUID CRYSTALLINE POLYMERS

[75] Inventor: Murali Rajagopalan, South Dartmouth, Mass.

[73] Assignee: Acushnet Company, Fairhaven, Mass.

[21] Appl. No.: 09/021,742

[22] Filed: Feb. 11, 1998

[51] Int. Cl.[6] .......................... A63B 37/12; A63B 37/00
[52] U.S. Cl. ...................... 525/132; 525/425; 525/424; 525/444; 473/354; 473/355; 473/357; 473/371; 473/374; 473/377; 473/378; 473/385
[58] Field of Search .................... 525/132, 425, 525/424, 444; 473/354, 355, 357, 371, 374, 377, 378, 385

[56] References Cited

U.S. PATENT DOCUMENTS

| | | | |
|---|---|---|---|
| H1187 | 5/1993 | George et al. | 525/445 |
| 4,274,637 | 6/1981 | Molitor | 273/235 R |
| 4,429,060 | 1/1984 | Ide | 521/182 |
| 4,429,061 | 1/1984 | Ide | 521/182 |
| 4,627,952 | 12/1986 | Ophir | 264/328.12 |
| 4,781,383 | 11/1988 | Kamada et al. | 273/228 |
| 4,842,754 | 6/1989 | Hakemi et al. | 252/299.01 |
| 4,952,334 | 8/1990 | Hakemi et al. | 252/299.01 |
| 4,963,642 | 10/1990 | Roggero et al. | 528/190 |
| 4,970,286 | 11/1990 | Genz et al. | 528/193 |
| 5,002,281 | 3/1991 | Nakahara et al. | 273/220 |
| 5,011,884 | 4/1991 | Rosenau et al. | 524/537 |
| 5,034,540 | 7/1991 | Haitko et al. | 548/461 |
| 5,070,157 | 12/1991 | Isayev et al. | 525/444 |
| 5,298,593 | 3/1994 | Fujiwara et al. | 528/277 |
| 5,334,695 | 8/1994 | Roggero et al. | 528/193 |
| 5,346,970 | 9/1994 | Dashevsky et al. | 525/444 |
| 5,545,686 | 8/1996 | Carter et al. | 524/513 |
| 5,688,192 | 11/1997 | Aoyama | 473/374 |

FOREIGN PATENT DOCUMENTS

| | | |
|---|---|---|
| 0 633 043 | 1/1995 | European Pat. Off. . |
| 2 288 176 | 10/1995 | United Kingdom . |

OTHER PUBLICATIONS

Davies, G.R. and Ward, I.M., (1987) *Structure and Properties of Oriented Thermotropic Liquid Crystalline Polymers in the Solid State in High Modulus Polymers,* Zachariades, A. and Porter, R, Eds., Marcel Dekker, NY, Chapter 2.

Davis, F. J. et al., (1986), *The Synthesis and Properties of Liquid Crystal Elastomers,* J. Chem. Soc., Chem. Commun., 1333–34.

Gleim, W. et al., (1987) *hermoelastic and pholtoelastic properties of crosslinked liquid–crystalline side chain polymers,* Makromol. Chem., 188, 1489–1500.

Handlos, A.A. et al., (1996), *Injection Molding of Microcomposites Based on Polypropylene and Thermotropic Liquid Crystalline Polymers,* Intern. Polymer Processing XI, 82–93.

Jackson, et al. (1990), *Polyesters 0f 4–4' –Biphenyldicarboxylic acid and aliphatic Glycols for High–Performance Plastics in Liquid Crystalline Polymers* (ACS Symposium Series 435), R.A. Weiss and C.K. Ober, Eds., American Chemical Society, Washington, D.C. Chapter 2.

Lekakou, C. et al., (1997), *Injection Moulding of Self–reinforcing Polymers and Polymer Blends,* Journal of Materials Science, 32, 1319–24.

Lewis, D. N. et al. (1987), *Processing of Polymer Liquid Crystals,* in *High Modulus Polymers,* Zachariades, A. and Porter, R., eds., Marcel Dekker, New York, 1–36.

Machiels, A. G. C. et al. (1996), *Formation, Stability, and Properties of In–situ Composites Based on Blends of a Thermotropic Liquid Crystalline Polymer and a Thermoplastic Elastomer,* Polymer Engineering and Science, Mid–Oct., 36(19), 2451–66.

O'Donnell, H.J. et al. (1994), *The Effect of Injection Molding Conditions on the Mechanical Properties of an In Situ Composite: Polypropylene and a LCP Based on HBA/HNA,* ANTEC '94, 1606–12.

Zentel, R. et al., (1995), *Create Ferroelectric Liquid Crystate Elastomers,* Chemtech, May, 41–48.

Xu, Q. et al., (1996) *Injection Molding of PC/PBT/LCP Ternary In Situ Composite,* Polymer Engineering and Scince, Mar., 36(6), 769–77.

Zentel, R. (1989), *Liquid Crystalline Elastomers,* Angew. Chem. Adv. Mater., 101(10), 1437–45.

Zentel, R., et al. (1987), *Stress–induced Orientation in Lightly Crosslinked Liquid–Crystalline Side–Group Polymers,* Makromol. Chem., 188, 665–74.

Zhang, B., et al. (1992) *Liquid Crystalline Ionomers. I. Main–Chain Liquid Crystalline Polymer Containing Pendant Sulfonate Groups,* Journal of Polymer Science, 30, 91–97.

*Primary Examiner*—David Buttner
*Attorney, Agent, or Firm*—Pennie & Edmonds, LLP

[57] ABSTRACT

Novel golf ball compositions which contain liquid crystalline polymers and liquid crystalline polymer blends. These compositions can be foamed or unfoamed. Golf balls that employ at least one layer of these blends in any of the golf ball cover, core, or a mantle situated between the cover and the core provide ball properties and performance similar to and in some cases better than the state of the art ionomer based golf balls.

34 Claims, 2 Drawing Sheets

GOLF BALL INCORPORATING LIQUID CRYSTALLINE POLYMERS

FIELD OF THE INVENTION

The present invention relates to golf balls and, in particular, to golf balls having at least one layer comprising at least one liquid crystalline polymer. The liquid crystalline polymer may be mixed with one or more thermoset or thermoplastic polymeric materials to form a blend, and may be foamed or unfoamed. The layer may be located in any of the cover or core of the ball or in a mantle layer located between the cover and the core.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but they also have a very hard "feel", which many golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. For example, U.S. Pat. No. 4,274,637 to Molitor discloses two- and three-piece golf balls having covers completely or partially formed from a cellular polymeric material to improve backspin, but does not provide any examples that compare the spin rates of the disclosed golf balls with those of prior art balls.

U.S. Pat. No. 5,002,281 to Nakahara et al. discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 mm and a Shore D hardness of 55 to 65.

European Patent Application 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

U.S. Pat. No. 5,688,192, to Aoyama, discloses compressible materials, i.e., gases, in the core of a solid construction golf ball to simulate the effects of trapped air in a wound ball.

None of these disclosures utilizes the unique physical properties of liquid crystalline polymeric materials, and there is no known disclosure of a golf ball using these materials.

Liquid crystalline polymers exhibit unique properties due to anisotropic ordering and orientation of the polymer chains within macroscopic domains of the material. The domain ordering in liquid crystalline polymers is typically dependant on the conditions under which the polymers are processed, and the ordering may be obtained either by varying the concentration of the polymer in solution ("lyotropic" liquid crystallinity) or by varying the temperature of the neat polymer ("thermotropic" liquid crystallinity). For thermotropic liquid crystalline polymers, the domain ordering is maintained at temperatures at which the materials are fluid; such ordered fluid phases are termed "mesophases" in that their characteristics are intermediate between those of an isotropic liquid and those of a crystalline solid.

As illustrated in FIG. 4, there are three common mesophase structures of thermotropic liquid crystalline polymers: 1) nematic mesophase structures in which the polymer chains on average are parallel to one another but there is no other structural ordering; 2) smectic C mesophase structures in which the polymer chains (or blocks within the polymer chains) are parallel to one another and also form a layered structure, with the parallel direction of the polymer chains (or blocks within the polymer chains) being other than perpendicular to the planes of the layers; and 3) smectic A mesophase structures in which the polymer chains (or blocks within the polymer chains) are parallel to one another and also form a layered structure, with the parallel direction of the polymer chains (or blocks within the polymer chains) being perpendicular to planes of the layers.

Domain ordering makes certain liquid crystalline polymers extremely durable. It makes other liquid crystalline polymers particularly elastic, or thixotropic, or compressible. Furthermore, polymer blends that include liquid crystalline polymers have been found to be self-reinforcing.

Self-reinforcing blends, also known as microcomposites, form when one or more liquid crystalline polymers are blended with one or more thermoset or thermoplastic polymers in such a way that the liquid crystalline polymer or polymers form fibrillar domains within the blend. These fibrillar domains act to reinforce the overall blend in much the same fashion as with steel rods ("re-bar") in a concrete fabrication. The self-reinforcing blends can be designed to produce mechanical properties intermediate between those of the liquid crystalline polymer or polymers and those of the thermoset or thermoplastic polymer or polymers.

Thermotropic liquid crystalline polymers have recently become commercially available. For example, Hoechst Celanese produces and markets Vectra®, and Amoco Manufacturing produces and sells Xydar®.

Thermotropic liquid crystalline polymers attain their ordering due to mesogenic units that are part of the polymer macromolecules. These mesogenic units are typically, though not exclusively, comprised of functionalized and non-functionalized, polarizable, aromatic and heteroaromatic groups; and these mesogenic units may be accompanied by less polarizable aliphatic groups that act as spacer units in the polymers. Thermotropic liquid crystalline polymers may be divided into two broad categories, main chain and side chain liquid crystalline polymers, that differ according to whether the mesogenic units are part of the polymer backbone (main chain) or are appended to the polymer backbone (side chain).

Thermotropic liquid crystalline polymers are well known. For example, U.S. Pat. Nos. 5,334,695 and 4,963,642, both to Roggero et al., disclose thermotropic copolyesters containing (I) spacer units derived from a saturated, aliphatic dicarboxylic acid, and (II) mesogenic units derived from combinations of (a) 4,4'dihydroxybiphenyl and alkyl or alkenyl derivatives of 4,4'dihydroxybiphenyl, and (b) 4-hydroxybenzoic acid or alkyl and alkenyl derivatives of 4-hydroxybenzoic acid.

Other examples of thermotropic liquid crystalline polymers are found in U.S. Pat. No. 5,298,593 to Fujiwara et al., which discloses polyesters produced by polycondensation of an ester monomer of the formula $R^2$—COO—$Ar^1$—COO—$R^1$—OOC—$Ar^1$—OOC—$R^2$ with an aromatic dicarboxylic acid compound of formula $X^1$—OOC—$Ar^2$—COO—$X^2$ and aromatic carboxylic acid compound of formula $R^3$—OOC—$Ar^2$—$X^3$, where $R^1$, $R^2$, and $R^3$ are independently 1 to 6 carbon alkyl or alkenyl groups, $Ar^1$, $Ar^2$, and $Ar^3$ are independently substituted or unsubstituted 6 carbon to 18 carbon aromatic hydrocarbons, and $X^1$, $X^2$, and $X^3$ are independently either hydrogen or 1 to 10 carbon alkyl groups.

U.S. Pat. No. 5,034,540 to Haitko et al. discloses thermotropic liquid crystalline polymers comprising polyester-etherimide repeating units of the structure —O—Ar-PABA-o-phthalimide- where PABA has the usual meaning of p-aminobenzoic acid, and Ar signifies p-phenyl, 4,4'-biphenyl, or 2,6-naphthyl subunits.

U.S. Pat. No. 4,970,286 to Gentz et al. discloses fully aromatic moldable liquid crystalline polyesters that are melt processable at relatively low temperatures, and whose mesogenic units include 4,4"-terphenyldicarboxylic esters, p-hydroxybenzoic esters, terephthalic esters, hydroquinone esters, and combinations of these esters.

Davies and Ward, in *High Modulus Polymers*, Zachariades, A. and Porter, R, Eds., Marcel Dekker, N.Y., 1987, Ch. 2, disclose liquid crystalline copolyesters of p-hydroxybenzoic acid and 2-hydroxy-6-naphthoic acid.

Jackson and Morris, in *Liquid Crystalline Polymers* (ACS Symposium Series 435) R. A. Weiss and C. K. Ober, Eds., American Chemical Society, Washington, D.C., 1990, Ch. 2, disclose liquid crystalline homo and copolyesters of 4,4'-biphenyl-dicarboxylic acid and trans-4,4'-stilbene-dicarboxylic acid.

Lewis and Fellers, in *High Modulus Polymers*, Zachariades, A. and Porter, R, Eds., Marcel Dekker, N.Y., 1987, Ch. 1, disclose processing of liquid crystalline homo- and co-polyesters of hydroquinone terephthalate, p-acetoxybenzoic acid, 2,6-dihydroxynaphthalene, and 2,6-naphthalenedicarboxylic acid.

None of these references teach the use of liquid crystalline polymers in the golf ball art.

Liquid crystalline polymers and polymer blends, which can be thermoformed, provide their desired physical properties with the fabrication ease of polyethylene, making them particularly suitable for use in golf balls.

Blends of liquid crystalline polymers with other liquid crystalline and thermoset or thermoplastic materials are also known. For example, U.S. Pat. No. 5,545,686, to Carter, discloses rubber compositions that are blends of one or more elastomers with one or more thermotropic liquid crystalline polymers and carbon black.

Another example of a thermoformable blend is found in U.S. Pat. No. 5,346,970 to Dashevsky et al., which discloses moldable blends of flexible coil polymers such as poly (ethylene terephthalate) ("PET") with liquid crystalline polymers and liquid crystalline block copolymers of the formula —[—O-p-Phenyl-COO—$(CH_2)_n$-p-Phenyl -CO—]$_x$—where n is between 2 and 10 and x is between 2 and about 50.

Another blend comprising a liquid crystalline polymer is found in U.S. Pat. No. 5,011,884 to Roseneau et al., which discloses molding compositions formed from blends of thermotropic liquid crystalline polymers with polyesters and polycarbonates.

Blends between thermotropic liquid crystalline polymers and linear alternating polymers formed between carbon monoxide and ethylenically unsaturated hydrocarbons are disclosed in United States Statutory Invention Registration H1187 to George et al.

Blends of liquid crystalline polymers with thermoplastic elastomers are also known. For example, in *Polym. Eng. Sci.* 36, (1996) 2451, Machiels and coworkers disclose the preparation and properties of in situ composites based on Vectra® A900 (a liquid crystalline random copolyester of about 73 wt. % 4-hydroxybenzoic acid and 27% 2-hydroxy-6-naphthoic acid) and Arnitel® em630 elastomer (a block copolymer comprising a blend of about 25 wt. % polyoxytetramethylene with about 75 wt. % polybutylene terephthalate). Such composites show significant increase in storage moduli and tensile strengths as compared to the unblended elastomers.

Processing conditions and blends between thermotropic liquid crystalline polymers and melt-processable thermoset or thermoplastic polymers, which blends exhibit improved properties over conventional polymers, are disclosed in UK Patent Application GB 2288176 A to Makhija et al.

Blends between main chain and side chain liquid crystalline polymers are found in U.S. Pat. Nos. 4,842,754 and 4,952,334, both to Hakemi et al., which disclose compatible blends of at least one main chain thermotropic liquid crystalline polymer with at least one side chain liquid crystalline polymer, both polymers comprising mesogenic units connected by ester, amide, imide, keto and ether linkages, and both polymers comprising a wide variety of aromatic and heteroaromatic mesogen units, and both polymers optionally containing spacer units.

Self-reinforcing blends of at least two liquid crystalline polymers are found in U.S. Pat. No. 5,070,157, to Isayev et al., which discloses blends of wholly aromatic polyesters that phase-separate in the solid state due to high-strain melt processing.

Foamable liquid crystalline polymers are also known. For example, U.S. Pat. Nos. 4,429,060 and 4,429,061, both to Ide, disclose high performance foams of thermotropic liquid crystalline polymers. The polymers disclosed include esters of 6-hydroxy-2-naphthoic acid, meta- and para-hydroxy benzoic acids, terephthalic acid, and combinations of these acids.

Liquid crystalline elastomers are also well known. For example, Rudolf Zentel and coworkers have published a series of papers describing both main chain and side chain liquid crystalline polyacrylates, as well as side chain liquid crystalline polysiloxanes.

In *Angew. Chem. Adv. Mater.* 101, (1989) 1439, Zentel discloses main chain elastomeric liquid crystalline 6-{4-[4'-(6-hydroxy-1-hexoxy)phenyl]-phenoxy}-1-hexyl 2-prop-2-enyl) malonic polyesters that are crosslinked using siloxane oligomers. In that paper, Zentel also discloses side chain polyacrylic and polymethylmethacrylic liquid crystalline polymers where the pendant mesogenic ester is a 6-{4-[4'-methoxy) phenoxy-carbonyl]phenoxy}-1-hexyl group and there is a minor fraction of ω-hydroxyhexyl pendant ester groups that are crosslinked using bis-4-isocyanatophenyl methane.

In *Makromol. Chem.* 188, (1987), 665, Zentel and Benalia disclose side chain polyacrylic liquid crystalline polymers where the pendant mesogenic ester is a 6-{4-[4'-cyano) phenoxycarbonyl]phenoxy}-1-hexyl group, and there minor fraction of ω-hydroxy-n-hexyl ester groups that are crosslinked using 1,6-diiso-cyanatohexane.

In *Chemtech*, May 1995, 41, Zentel and Brehmer disclose liquid crystalline polysiloxane elastomers formed by reaction of a polysiloxane with 4'-acetoxy-4-[undec-1-en-11-oxy]-biphenyl followed by functionalization with N-(5-carboxypentyl) acrylamide and photolytic crosslinking.

Other liquid crystalline elastomers are disclosed by Finkelman and coworkers. For example, in *Makromol. Chem.* 188, (1987), 1489, Gleim and Finkelman disclose liquid crystalline polysiloxane elastomers formed by reaction of a polysiloxane with 4'-methoxyphenyl-4-ω-vinyl-n-butoxy) benzoate and with 4'-methoxyphenyl-4-ω-vinyl-n-pentoxy) benzoate; these elastomers are crosslinked using α-ω-divinyl siloxane oligomers.

Finally, Davis et al. disclose liquid crystalline crosslinked elastomers formed by copolymerization of ethylene glycol diacrylic ester and 2-[4-(4'-cyanophenoxycarbonyl)-phenoxy]ethyl acrylate.

Liquid crystalline ionomers are also known. For example, in *J. Polym. Sci; Pt. A: Polymer Chemistry*, 30, (1992) 91, Zhang et al. disclose main chain liquid crystalline ionomers formed from copolymerization of a dye, brilliant yellow, with 4,4'-dihydroxy-α,α'-dimethyl-benzalazine and either dodecanedioyl chloride or sebacoyl chloride to form their respective ester spacer groups.

Injection molding of thermotropic liquid crystalline polymers and polymer blends is well known. For example, U.S. Pat. No. 4,627,952 to Ophir describes an apparatus and process for maintaining laminar flow during the entire injection process of thermotropic liquid crystalline polymers.

Handlos and Baird in *International Polymer Processing*, (1996) 82, describe a process for preforming pellets of a liquid crystalline and thermoset or thermoplastic polymer blend, where such pellets are then used as feed stock for injection molding of such blends, and where the so molded blend forms a self-reinforcing composite.

Lekakou et al., in *J. Mater. Sci.*, 32 (1997) 1319, describes how to improve the self-reinforcement of injection-molded liquid crystalline polymers.

Lewis and Fellers, in *High Modulus Polymers*, Zachariades, A. and Porter, R, Eds., Marcel Dekker, N.Y., 1987, Ch. 1, discuss a wide variety of liquid crystalline polymers and polymer blends that are processible by injection molding.

O'Donnell et al., in ANTEC '94, (1994) 1606, describes injection molding techniques for composites between polypropylene and liquid crystalline polymers.

Xu et al., in *Polym. Eng. Sci.*, 36 (1996) 769, describes injection molding of a ternary blend of a liquid crystalline polymer with polybutylene terephthalate and polycarbonate. This ternary blend exhibits improved mechanical properties over binary blends involving liquid crystalline polymers.

None of these references discloses the use of liquid crystalline polymers in the golf ball art. Therefore, there is a need in the golf ball art for a golf ball incorporating liquid crystalline polymers and blends of liquid crystalline polymers and other polymers. As described below, the inclusion of foamed and unfoamed liquid crystalline polymers and liquid crystalline polymer blends will allow highly durable golf balls to be produced with virtually any combination of feel and spin rate.

SUMMARY OF THE INVENTION

The present invention relates to golf balls, and, in particular, to golf balls comprising at least one layer, wherein the layer comprises a liquid crystalline polymer containing material selected from the group consisting of liquid crystalline polymers and liquid crystalline polymer blends. The liquid crystalline polymer blends comprise from about 0.01% to about 99.99 wt. % of at least one liquid crystalline polymer and from about 99.9 to about 0.01 wt. % of at least one polymer selected from the group consisting of thermoset and thermoplastic polymers. In addition, the liquid crystalline polymer comprises at least one mesogenic unit. The layer may form at least a portion of any of the cover, mantle, or core of the golf ball, where the mantle is situated between the cover and the core. Any of the core, cover, and mantle of the golf balls of the invention can be formed of one layer or a plurality of layers, as that term is used herein.

Generally, for golf balls comprising cores having a layer of liquid crystalline polymer or liquid crystalline polymer blend, the liquid crystalline polymer or liquid crystalline polymer blend may optionally have a foamed structure. The layer has a thickness of from about 0.005 to 0.125 inch. The core preferably has a diameter of from about 1 to 1.63 inch. The core may comprise a liquid center or a solid polymeric center, and the golf ball optionally may comprise elastomeric windings in a layer surrounding the core.

For golf balls comprising a cover and a core and a mantle situated between the cover and the core, where the mantle comprises a layer of liquid crystalline polymer or liquid crystalline polymer blend with a foamed structure, the layer preferably has a thickness of from about 0.005 to 0.125 inch. Cores in golf balls according to the invention for use with mantles may comprise a liquid or solid center optionally wrapped in elastomeric windings. Preferably, in golf balls with such mantles, the core has a diameter of from about 1 to 1.63 inch and the cover has a thickness of from about 0.005 to 0.125 inch.

Preferably, the liquid crystalline polymer is a liquid crystalline polyester, a liquid crystalline polysiloxane, a liquid crystalline elastomer, or a liquid crystalline ionomer. Pendant groups may be also added to liquid crystalline polymers by post-polymerization reactions to modify physical or chemical properties of the polymer.

Preferably, a golf ball according to the invention comprises a cover and a core and a mantle situated between the cover and the core, wherein at least one of the cover, the core, and the mantle comprises at least one layer comprising a liquid crystalline polymer or liquid crystalline polymer blend. Preferably, the layer has a foamed structure, and preferably, the liquid crystalline polymer blend is self-reinforcing.

DETAILED DESCRIPTION OF THE PREFERRED EMBODIMENTS

Figure 1:
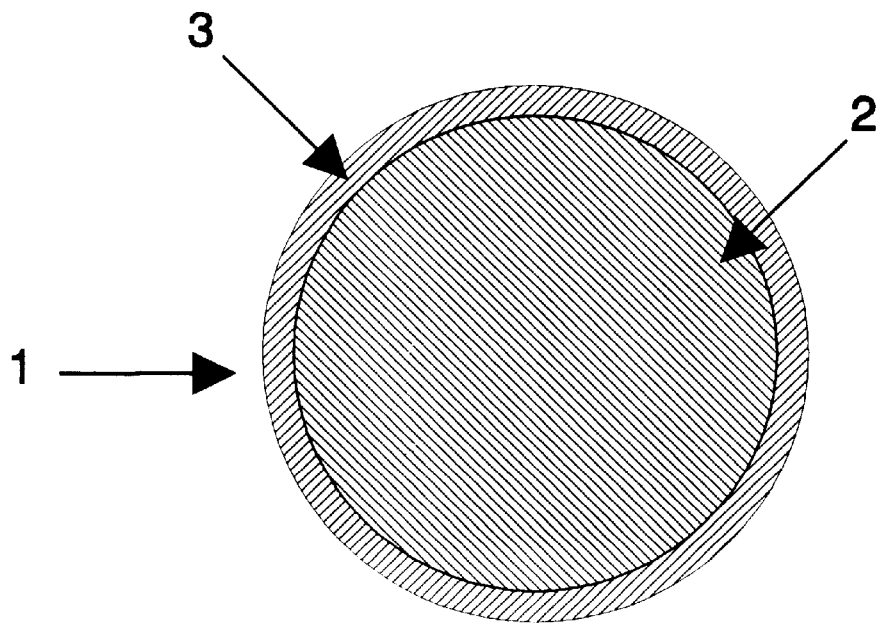
FIG. 1 is a cross-sectional view of a two-piece golf ball according to the invention with a one-piece core.

As used herein, the term "mesogenic unit" includes any portion of a polymer that is responsible for the formation of a liquid crystalline mesophase. As used herein, the term "liquid crystalline polymer" includes any polymer, copolymer, or terpolymer, and, in particular, any polymer containing one or more mesogenic units either as part of the polymer backbone or appended to the polymer backbone. Mesogenic units may be included as part of a liquid crystalline polymer either by virtue of their being present as part of a monomer undergoing a polymerization reaction (such mesogens thus are present in the polymer because they are part of the "reaction product" of the polymerization reaction of the monomers) or the mesogenic units may be added as side chains in a post-polymerization reaction.

The term "liquid crystalline polymer blend" includes polymer blends in which at least one thermoset or thermoplastic polymer is blended with one or more liquid crystalline polymers, and in which the portion of the one or more liquid crystalline polymers can range from about 0.01 to about 99.99 wt. % (weight percent), based on 100 wt. % polymer in the blend. The term "liquid crystalline polymer containing material" includes liquid crystalline polymers and liquid crystalline polymer blends. In addition, the term "layer" includes any generally spherical portion of a golf ball or golf ball core, center, or mantle, including one-piece cores and one-piece balls. A mantle is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein.

The present invention relates to golf balls including at least one layer comprising one or more liquid crystalline polymers or liquid crystalline polymer blends. The liquid crystalline polymer blends of the invention typically comprise a blend of about 0.01% to 39.99 wt. % of at least one liquid crystalline polymer and about 99.9 to 0.01 wt. % of at least one thermoset or thermoplastic polymer. The blends may be foamed during molding by any conventional foaming or blowing agent. In addition, liquid crystalline polymers may be thermoformed, and, thus can be compression molded. Therefore, either injection molding or compression molding may be used to form a layer of foamed or unfoamed liquid crystalline polymer or liquid crystalline polymer blend in the cover, core, or mantle of a golf ball according to the invention. Liquid crystalline polymers and liquid crystalline polymer blends are resilient, easily processed materials that allow highly durable golf balls to be produced with virtually any combination of feel and spin rate. Liquid crystalline polymers useful in the present invention may have substantially any flexural modulus, but preferably have a flexural modulus of between about 5,000 and about 2,000,000 psi (ASTM D790).

Examples of the golf balls of the present invention are illustrated in the Figures. For example, FIG. 1 illustrates a golf ball according to the invention with a one-piece core. Golf ball 1 comprises a core 2 and a cover 3, wherein either of core 2 or cover 3 includes at least one layer comprising a foamed or unfoamed liquid crystalline polymer or liquid crystalline polymer blend.

Figure 2:
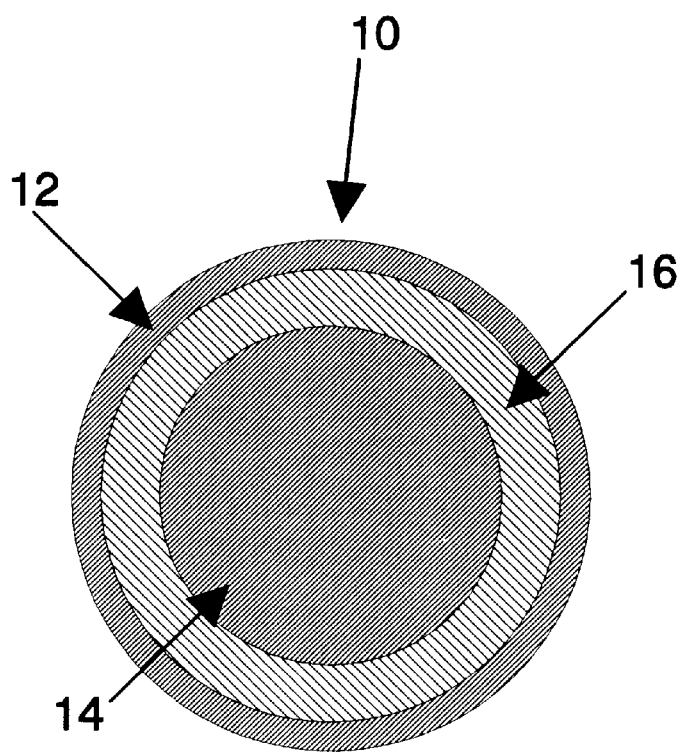
FIG. 2 is a cross-sectional view of a two-piece golf ball according to the invention incorporating a multi-layer core.

Similarly, FIG. 2 illustrates a golf ball according to the invention incorporating a multi-layer core. Golf ball 10 comprises a cover 12, a core having a center 14 and at least one additional core layer 16. Any of the cover 12, center 14, or core layer 16 may incorporate at least one layer of a foamed or unfoamed liquid crystalline polymer or liquid crystalline polymer blend.

Particularly preferred in any of the layers of the present invention are liquid crystalline polymer blends that are self-reinforcing. The self-reinforcing liquid crystalline polymer blends that are useful in the present invention include from about 0.01 to about 40 wt. % of at least one thermotropic liquid crystalline polymer blended with at least one thermoset or thermoplastic polymer. "Self-reinforcing" blends, as that term is used herein, form with segregation of the liquid crystalline and thermoset or thermoplastic materials such that the liquid crystalline materials form fibrillar domains within the thermoset or thermoplastic materials. Non-limiting examples of synthesis and processing of self-reinforcing liquid crystalline polymer blends are disclosed by Isayeve et al., U.S. Pat. No. 5,070,157, by Handlos and Baird in Intern. Polym. Process. XI (1996) 82, and by the references contained in these disclosures. These examples disclose liquid crystalline polymers in a matrix of a wide variety of conventional polymers. The blends range from less than 1% to about 100% liquid crystalline polymer, but more preferred blends contain from about 1% to about 30% liquid crystalline polymers. Such blends are melt processible and show improved mechanical properties over the conventional polymers without the fibril-forming liquid crystalline polymer.

Golf balls according to the invention may incorporate cores comprising liquid crystalline polymers, liquid crystalline polymer blends, or conventional materials. Liquid crystalline polymer and liquid crystalline polymer blend cores may be either one-piece, comprising a single piece of foamed or unfoamed liquid crystalline polymer or liquid crystalline polymer blend, or multi-piece, comprising a liquid or solid core or center, and may comprise one or more layers in which any of the center or the layers may comprise a foamed or unfoamed liquid crystalline polymer or liquid crystalline polymer blend.

The cores of the golf ball according to the present invention may comprise a blend of (1) at least one elastomer selected from the group consisting of polybutadiene rubber, styrene-butadiene rubber, synthetic polyisoprene rubber, natural rubber, isoprene-butadiene rubber, isoprene-butadiene-styrene rubber, nitrile rubber, carboxylated nitrile rubber, and EPDM rubber, (2) at least one thermotropic liquid crystalline polymer containing an aliphatic spacer, wherein the thermotropic liquid crystalline polymer exhibits no apparent crystalline to nematic transition, wherein the thermotropic liquid crystalline polymer exhibits nematic order above its glass transition temperature, wherein the glass transition temperature of the thermotropic liquid crystalline polymer is within the range of 20° C. to 180° C. and wherein the thermotropic liquid crystalline polymer is comprised of repeat units which are derived from a halogenated hydroquinone, para-hydroxybenzoic acid, and an aliphatic dicarboxylic acid having the structural formula HOOC—$[CH_2]_n$—COOH wherein n represents an integer from about 4 to about 8, and (3) optionally carbon black. Synthesis and processing of such blends is disclosed by Carter et al. in U.S. Pat. No. 5,545,686.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least about 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts acrylic or methacrylic acid. The filler typically includes materials such as zinc oxide, barium sulfate, silica, calcium carbonate, zinc carbonate and the like. Golf balls of the invention may also have conventional wound cores or wound cores whose windings are comprised of liquid crystalline polymeric elastomer blends.

Figure 3:
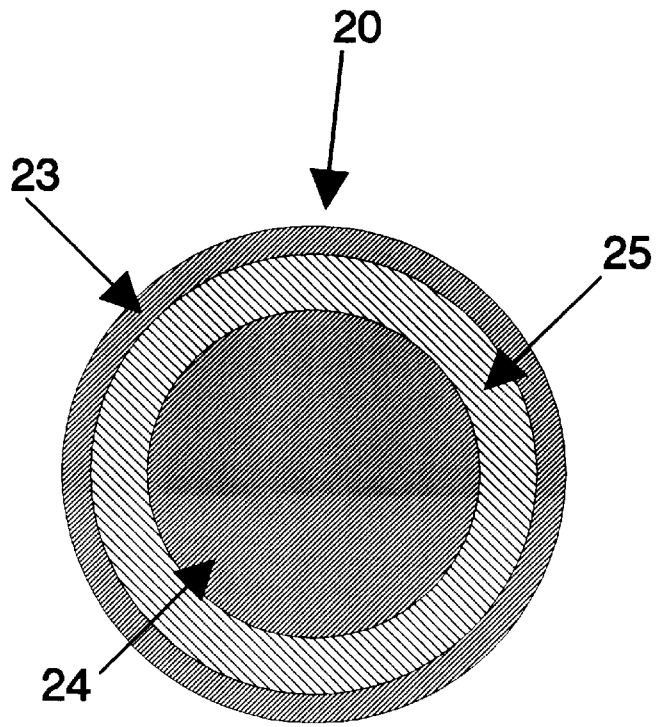
FIG. 3 is a cross-sectional view of a golf ball according to the invention incorporating a mantle layer between the cover and the core.
Figure 4:
FIG. 4 depicts three common mesophase structures exhibited by liquid crystalline polymers.

Golf balls of the invention as noted above may also include a mantle layer. As used herein, the term "mantle layer" designates a generally spherical layer intermediate between a cover layer and a core layer. Those of ordinary skill understand that such mantle layers are also known in the art as "intermediate cover layers" or "inner cover layers." Where a golf ball of the invention includes a mantle layer, the mantle preferably comprises at least one layer of a foamed or unfoamed liquid crystalline polymer or liquid crystalline polymer blend. A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least one layer of a foamed or unfoamed liquid crystalline polymer or liquid crystalline polymer blend. Moreover, core 24 may be a one-piece core, a multi-layer core, or a wound core.

Golf balls according to the invention may incorporate cover layers comprising foamed or unfoamed liquid crystalline polymers or liquid crystalline polymer blends or conventional materials, including balata and ionomer cover stock. Liquid crystalline polymer and liquid crystalline polymer blend cover layers according to the invention may be used with conventional solid or wound cores, as well as those comprising liquid crystalline polymer blends.

The ordering of the polymer chains in liquid crystalline polymers provides improved tensile properties when compared to thermoset or thermoplastic polymers. When a layer of foamed liquid crystalline polymer or liquid crystalline polymer blend is used in a golf ball cover or mantle, the ball has a softer feel than balls using a hard ionomer, and is more deformable. The increased deformation of the cover and outer layers of the ball provides improved control due to the increased "bite" on the clubface when the ball is struck, which prevents or reduces sliding of the ball up the clubface, and allows more energy to be imparted directly to the core at impact, providing a greater initial velocity. The improved control and feel are similar to those obtained using a soft balata cover without the decrease in durability that is typically associated with balata.

The use of foamed liquid crystalline polymer or liquid crystalline polymer blend also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Examples of types of liquid crystalline polymers useful in the invention include, but are not limited to polyesters, polyacrylates, poly(ether-imides), polysiloxanes, elastomers, and ionomers. Liquid crystalline polymers useful in the present invention include those described in the references above, as well as any other such material which would be familiar to one of ordinary skill in the art. All of the disclosures of the references above are hereby incorporated by reference. The golf balls of the present invention will include at least one layer of a liquid crystalline polymer or liquid crystalline polymer blend.

Those of ordinary skill in the art will understand that the liquid crystalline polymers useful in the present invention may be formed in any of the ways known in the art for producing polymers, and more particularly for producing liquid crystalline polymers.

When a golf ball of the present invention is formed with one or more layers comprising a liquid crystalline polyester, such a liquid crystalline polyester may be either a homopolymer or a copolymer. Such liquid crystalline polyesters useful in the present invention may be synthesized from dicarboxylic acids and from derivatives of dicarboxylic acids including but not limited to acid halides, acid anhydrides, esters, amides, imides, acid salts, or any other acid derivative known in the art to be useful in the formation of ester linkages.

When a golf ball of the present invention is formed with one or more layers comprising a liquid crystalline polyester, the liquid crystalline polyester may also be synthesized from diols and from derivatives of diols including but not limited to alcoholates, ketals, acetals, esters, ethers, epoxides, lactones, and from any other alcohol related species known in the art to be useful in the production of ester linkages.

When a golf ball of the present invention is formed with one or more layers comprising a liquid crystalline polyester, the liquid crystalline polyester may also be synthesized from hydroxy carboxylic acids and from derivatives of hydroxy carboxylic acids. Such derivatives include all of those listed above for carboxylic acids and for alcohols, as well as from any other derivatives of hydroxy acids known in the art to be useful in the formation of ester linkages.

When a golf ball of the present invention is formed with one or more layers comprising a liquid crystalline polyester, the liquid crystalline polyester may also be synthesized from combinations of hydroxy carboxylic acids, dicarboxylic acids and diols as well as from combinations of the derivatives of hydroxy carboxylic acids, dicarboxylic acids and diols mentioned in the preceding paragraphs.

When a golf ball of the present invention is formed with one or more layers comprising a liquid crystalline polyester, the liquid crystalline polyester may also be synthesized from repeating mesogenic units or from combinations of mesogenic units and spacer units.

The liquid crystalline copolyesters used in the golf balls of the present invention may be synthesized by random copolymerization reactions or from block polymerizations. Non-limiting structural examples of the mesogenic units useful in forming layers containing liquid crystalline polyesters in the golf balls of the present invention are found in Table 1.

TABLE 1

Examples of Mesogenic Units that form Liquid Crystalline Polyesters

| Structure | Exemplary Monomer Sources (abbreviation) |
| --- | --- |
| [naphthalene-2,6-dicarboxylate structure] | 2,6-naphthalene dicarboxylic acid (NDA) |
| [6-oxy-2-naphthoate structure] | 6-hydroxy-2-naphthoic acid (HNA) |
| [p-oxybenzoate structure] | p-acetoxybenzoic acid (PAB)<br>p-hydroxybenzoic acid (HBA) |
| [hydroquinone terephthalate structure] | hydroquinone terephthalate (HQT) |
| [2,6-dioxynaphthalene structure] | 2,6-dihydroxynaphthalene (DHN) |
| [4,4'-biphenyldicarboxylate structure] | 4,4'-biphenyldicarboxylic acid (BDA) |
| [trans-4,4'-stilbenedicarboxylate structure] | trans-4,4'-stilbenedi-carboxylic acid (SDA) |
| [4,4'-dioxybiphenyl structure] | 4,4'-dihydroxybiphenyl (DHB) |
| [terephthalate structure] | terephthalic acid (TA) |
| [4,4''-p-terphenyldicarboxylate structure] | 4,4''-p-terphenyldicarboxylic acid (TDA) |
| [p-dioxyphenylene structure] | p-hydroquinone (HQ) |

The liquid crystalline elastomers useful in the golf balls of the present invention are either homopolymers or copolymers. The liquid crystalline elastomers used in forming the golf balls of the present invention may be synthesized from any of the reactions known in the art to form liquid crystalline elastomers. Non-limiting structural examples of mesogenic and spacer units useful in the synthesis of liquid crystalline elastomers of the golf balls of the present invention are shown in Table 2.

The liquid crystalline ionomers useful in forming the golf balls of the present invention are either homopolymers or copolymers. These liquid crystalline ionomers may be synthesized from any of the reactions known in the art to form liquid crystalline ionomers. Non-limiting structural examples of mesogenic and spacer units useful in the synthesis of these liquid crystalline ionomers are shown in Table 3.

TABLE 2

Examples of Mesogenic and Spacer Units that Form Liquid Crystalline Elastomers ("Z" indicates location of a Polymer Backbone for Side-Chain Liquid Crystalline Polymers)

| Structure | Exemplary Monomer Sources (abbreviation) |
|---|---|
| —O—C(=O)—(CH$_2$)$_n$—C(=O)—O—   $n = 8, 10$ | Ethylene glycol diacrylic ester (EGD) |
| Z—CH$_2$—CH(Z)—CO$_2$—CH$_2$—CH$_2$—O—C$_6$H$_4$—CO$_2$—C$_6$H$_4$—CN | 2-[4-(4'-cyanophenoxycarbonyl)-phenoxy]ethyl acrylate (CPA) |
| —O—C(=O)—(CH$_2$)$_n$—C(=O)—O—   $n = 1$ to $10$ | Suberoyl chloride (SUA) Sebacoyl chloride (SEA) dodecanedioyl chloride |
| —OOC—C$_6$H$_4$—C$_6$H$_4$—COO— | 4,4'-biphenyldicarboxylic acid (BDA) |
| —O(CH$_2$)$_6$O—C$_6$H$_4$—C$_6$H$_4$—O(CH$_2$)$_6$OOC—CHCOO—   \|   H$_2$C—CH=CH$_2$ | 6-{4-[4'-(6-hydroxy-1-hexoxy)phenyl]-phenoxy)-1-hexyl 2-(prop-2-enyl)malonate (HPM) |
| CH$_3$O—C$_6$H$_4$—O—C(=O)—C$_6$H$_4$—O(CH$_2$)$_6$—OOCCH(Z)—CH$_2$ | 6-{4-[(4'-methoxy)phenoxycarbonyl]-phenoxy}-1-hexyl acrylate (MHA) |
| CH$_3$O—C$_6$H$_4$—O—C(=O)—C$_6$H$_4$—O(CH$_2$)$_6$—OOC—CH(CH)—CH$_2$(Z) | 6-{4-[(4'-methoxy)phenoxycarbonyl]-phenoxy}-1-hexyl methacrylate (MHM) |
| NC—C$_6$H$_4$—O—C(=O)—C$_6$H$_4$—O(CH$_2$)$_6$—OOC—CHCH$_2$(Z) | 6-{4-[(4'-cyano)phenoxycarbonyl]-phenoxy}-1-hexyl acrylate. (CHA) |
| H$_2$C=CHCONH(CH$_2$)$_5$CO$_2$—C$_6$H$_4$—C$_6$H$_4$—O(CH$_2$)$_{10}$—CH$_2$(Z) | 4'-acetoxy-4-[undec-1-en-11-oxy]-biphenyl (AUB) functionalized with N-(5-carboxypentyl) acrylamide (NPA) |
| CH$_3$O—C$_6$H$_4$—O—C(=O)—C$_6$H$_4$—O(CH$_2$)$_n$—CH$_2$—Z   $n = 4, 5$ | 4'-methoxyphenyl-4-(ω-vinyl-n-butoxy) benzoate (MBB) 4'-methoxyphenyl-4-(ω-vinyl-n-pentoxy) benzoate (MPB) |

TABLE 3

Examples of Mesogenic Units that form Liquid Crystalline Ionomers

| Structure | Exemplary Monomer Sources (abbreviation) |
|---|---|
| —O—⟨phenyl⟩—C(CH$_3$)=N—N=C(CH$_3$)—⟨phenyl⟩—O— | 4,4'-Dihydroxy-$_{a,a}$'-dimethylbenzalazine (DDBA) |
| —O—⟨phenyl⟩—N=N—⟨phenyl-YM⟩=⟨trans⟩=⟨phenyl-YM⟩—N=N—⟨phenyl⟩—O— | Brilliant Yellow (BY) |
| —Y = —O—P(=O)(O)—O—, —S(=O)(=O)—O—, —C(=O)—O$^-$ | |
| M = H$^+$, Na$^+$, Li$^+$, K$^+$, Ca$^{2+}$, NH$_4^+$, Zn$^{2+}$, Mg$^{2+}$, Cu$^{2+}$, Ba$^{2+}$, Al$^{3+}$ | |
| —O—C(=O)—(CH$_2$)$_n$—C(=O)—O—  $n = 8, 10$ | Dodecanedioyl chloride (DDC) Sebacoyl dichloride (SDC) |

One of ordinary skill in the art will appreciate that the structures shown in Tables 1, 2, and 3 may also contain various substitutions. For example, the hydrogens of the structures of the mesogenic and spacer units in these tables can be replaced, by way of non-limiting examples, by halogen, alkyl, cycloalkyl, alkenyl, alkynyl, aryl, acyl, ester, ether, amino, amido, hydroxy, keto, carboxy, mercapto, thiol, sulfoxide, sulfone, nitro, azo, diazo, cyano, azido. Furthermore, one of ordinary skill can appreciate that that cationic and zwitterionic liquid crystalline ionomers are also useful in the golf balls of the present invention.

The liquid crystalline polymer blend golf ball compositions of the present invention comprise blends of at least one liquid crystalline polymer and at least one thermoset or thermoplastic polymer that are formed using blending methods well known in the art. Non limiting examples of thermoset or thermoplastic polymers useful in blends for the golf balls of the present invention include thermoplastic polymers such as styrenic (e.g. polystyrene, ABS), olefinic (e.g. homopolymers and copolymers of ethylene and propylene, catalyzed by metallocene and single-site, as well as by conventional polymerization catalysts), acrylates (e.g. PMMA, PMA), polyurethanes, polycarbonates, polyesters (e.g. PET, PBT, and PPT), polyamides (e.g. Nylon 6, Nylon 66, Nylon 12), and olefinic ionomers (e.g. Dupont Surlyn®). Other non-limiting examples of polymers useful in the golf balls of the present invention include thermoset polyurethanes and polyureas, for example, those disclosed in U.S. Pat. Nos. 5,334,673 and 5,484,870. Other non-limiting examples of polymers useful in the golf balls of the present invention include (poly(ethylethylene), poly (heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), poly(silanes) and poly(silazanes), main-chain heterocyclic polymers and poly(furan tetracarboxylic acid diimides) as well as the classes of polymers to which they belong.

Golf balls of the present invention also may comprise blends of liquid crystalline polymers with thermoplastic elastomers (hereinafter "TPE"). For example, golf ball covers comprising TPEs blended with liquid crystalline polymers are particularly preferred in the present invention. Commercially available TPE copoly(ester-ethers) suitable for the present invention include the HYTREL® series from DuPont, which includes HYTREL® 3078, G3548W, 4056, G4078W and 6356; the LOMOD® series from General Electric, which includes LOMOD® ST3090A and TE3055A; ARNITEL® and URAFIL® from Akzo; ECDEL® from Eastman Kodak; and RITEFLEX® from Hoechst Celanese. Commercially available TPE copoly (amide-ethers) suitable for the present invention include the PEBAX® series from Elf-Atochem, which includes PEBAX® 2533, 3533, 4033 and 6333; the GRILAMID® series by Emser, which includes Ely 60; and VESTAMID® and VESTENAMER® by Hüls. Commercially available TPE polyurethanes suitable for the present invention include the ESTANE® series from the B.F. Goodrich Company, which includes ESTANE® 58133, 58134, 58144 and 58311; the PELLETHANE® series from Dow Chemical, which includes PELLETHANE® 2102-90A and 2103-70A; ELASTOLLAN® from BASF; DESMOPAN® and TEXIN® from Bayer; and Q-THANE® from Morton International.

Furthermore, styrene-butadiene-styrene (hereafter "SBS"), and optionally isoprene (to form styrene-isoprene-styrene; hereafter "SIS") form TPE polymers and block copolymers that are useful in the golf balls of the present invention. These SBS and SIS block copolymers may be hydrogenated to form, respectively, styrene-ethylene-butylene-styrene (SEBS) and styrene-ethylene-propylene-styrene (SEPS) block copolymers, both of which are also useful in the present invention. Examples of commercially available thermoplastic SBS or SIS copolymers suitable for the golf balls of the present invention include the KRATON® D series from Shell Chemical, which includes KRATON® D2109, D5119 and D5298; VECTOR® from Dexco; and FINAPRENE® from Fina Oil and Chemical.

Also, copolymers of ethylene and propylene or ethylene and butylene can be chemically linked to polystyrene blocks to form styrene-ethylene-styrene (hereafter "SES"). Examples of suitable commercially available thermoplastic SES copolymers include the KRATON® G series from Shell Chemical, which includes KRATON® G2705, G7702, G7715 and G7720; SEPTON® from Kuraray; and C-FLEX® from Concept.

Also, thermoplastic and elastomer or rubber blends may have an elastomer that is intentionally crosslinked or dynamically vulcanized (hereinafter "TEDV"). Suitable TEDVs include SANTOPRENE®, VYRAM® and TREFSIN® from Advanced Elastomer Systems, which includes SANTOPRENE® 101-73 and 203-40 and TREFSIN® 3201-60; the SARLINK® 2000 and 3000 series from DSM; and TELPRENE® from Teknor Apex.

Additionally, block polystyrene TPEs may be functionalized with polar moieties by grafting a functional comonomer, e.g., a reactive monomer such as maleic anhydride, onto the TPE in a post-polymerization reaction. Examples of commercially available styrene-block elastomers functionalized by grafting include the KRATON® series from the Shell Corporation, which includes KRATON® FG1901X and FG1921X. Furthermore, block polystyrene TPEs may be functionalized with hydroxy or epoxy substitution at the polymer chain ends. An example of a commercially available styrene-block elastomer functionalized by hydroxy termination is SEPTON® HG252 from the Mitsubishi Chemical Company.

One of ordinary skill can appreciate that the present invention is not limited to the preceding examples of conventional polymers and commercially available TPEs. The present invention is directed to blends of liquid crystalline polymers with any number of suitable thermoset or thermoplastic polymers where such blends provided the required mechanical properties for advantageous inclusion in one or more golf ball layers. These other suitable thermoset or thermoplastic polymers are known to those of ordinary skill in the art.

The amounts of polymers used in the golf ball compositions of the invention can vary from about 0.01 to 99.99 wt. % of the liquid crystalline polymers to about 99.99 to 0.01 wt. % of other polymers, preferably, 95 to 5 wt. % liquid crystalline polymers and 5 to 95 wt. % other polymer. Most preferred is from about 50 to 10 wt. % liquid crystalline polymer and from about 50 to 90 wt. % of other polymer.

Additional additives may also be added to the blends of the invention, such as, for example, interfacial tension modifiers, coloring agents, reaction enhancers, crosslinking agents, dyes, lubricants, fillers, excipients, process aids and other compounds commonly added to polymeric materials and/or golf ball layers for their usual purpose.

The blends of the invention are formed by combining the polymer components by methods familiar to those in the polymer blending art, for example, with a two roll mill, a Banbury mixer or a single or twin-screw extruder. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type.

Preferably, where self-reinforcing blends are incorporated into the golf balls of the present invention, the blends are first pre-blended, extruded and cut in the manner similar to that described by Handlos and Baird in *International Polymer Processing*, (1996) 82.

Conventional equipment used in the production of golf balls may be used to form the golf balls of the invention in a manner well known to those skilled in the art. For example, golf balls comprising the cover compositions of the invention can be made by injection molding cover stock around a core or by compression molding pre-formed half-shells of the cover stock into a ball mold in a conventional manner. Furthermore, golf ball mantle layers comprising the mantle layer compositions of the invention can be made by injection molding mantle layer stock formed from a liquid crystalline polymer or liquid crystalline polymer blend of the invention around a core or by compression molding pre-formed half-shells of the intermediate layer stock into a ball mold in a conventional manner, then covered by a layer comprising cover stock as described above, to form a multilayer golf ball.

Good results may be obtained by mixing the liquid crystalline polymer and thermoset or thermoplastic polymer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable liquid crystalline polymer blend using a retractable-pin mold. Such machines are conventional.

Cores comprising a liquid crystalline polymer blend may also be formed directly by injection molding or compression molding. When the layer or core is injection molded, a physical or chemical blowing or foaming agent may be included to produce a foamed layer. Blowing or foaming agents useful in forming foamed liquid crystalline polymer blends include, but are not limited to organic blowing agents, such as azobisformamide; azobisisobutyronitrile;

diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed liquid crystalline polymer blends may be formed by blending microspheres with the liquid crystalline polymer blend either during or before the molding process. Polymeric, ceramic, metal, and glass microspheres are useful in the invention, and may be solid or hollow and filled or unfilled.

For compression molded liquid crystalline polymer blend layers, half-shells are made by injection molding a liquid crystalline polymer blend in a conventional half-shell mold. The half-shells are placed about a previously formed center or core, cover, or mantle layer, and the assembly is introduced into a compression molding machine, and compression molded. The molded balls are then cooled while still in the mold, and finally removed when the layer of liquid crystalline polymer blend is hard enough to be handled without deforming. Additional core, mantle, and cover layers are then molded onto the previously molded layers, as needed, until a complete ball is formed.

After the final cover layer of the ball has been molded, the ball undergoes various conventional finishing operations such as buffing, painting and stamping.

The present invention relates to the formation of golf balls of any size. The *Rules of Golf* by the USGA dictate that a golf ball must have a diameter of at least 1.68 inches (4.27 cm). However, non-conforming golf balls can be any size. The preferred diameter of the golf balls is from about 1.68 inches to about 1.8 inches (4.57 cm). The more preferred diameter is from about 1.68 inches to about 1.76 inches (4.47 cm). A diameter of from about 1.68 inches to about 1.74 inches (4.42 cm) is most preferred, however diameters anywhere in the range of from 1.7 to about 1.95 inches (4.3 to 4.95 cm) can be used. Oversize golf balls above about 1.76 inches to golf balls having diameters as large as 2.75 inches (7 cm) are also within the scope of the resent invention.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A golf ball comprising at least one layer, said layer comprising a liquid crystalline polymer containing material selected from the group consisting of liquid crystalline polymers and liquid crystalline polymer blends, wherein said liquid crystalline polymer blends comprise from about 0.01% to about 99.99 wt. % of at least one liquid crystalline polymer and from about 99.9 to about 0.01 wt. % of at least one polymer selected from the group consisting of thermoset and thermoplastic polymers, and wherein said liquid crystalline polymer comprises at least one mesogenic unit.

2. The golf ball according to claim 1 wherein said liquid crystalline polymer containing material comprises a thermotropic liquid crystalline polymer.

3. The golf ball according to claim 2 wherein said thermotropic liquid crystalline polymer forms at least one nematic mesophase when maintained at a temperature in the range of from about 0° F. to about 500° F.

4. The golf ball according to claim 1, comprising a cover, wherein said layer forms at least a portion of said cover.

5. The golf ball according to claim 4, wherein said layer has a foamed structure.

6. The golf ball according to claim 5 wherein said liquid crystalline polymer comprises an ester formed from monomers selected from the group consisting of 6-hydroxy-2-naphthoic acid, meta-hydroxybenzoic acid, para-hydroxybenzoic acid, terephthalic acid, derivatives of these acids, and combinations of these acids or acid derivatives.

7. The golf ball according to claim 4, wherein said layer has a thickness of from about 0.005 to about 0.125 inch.

8. The golf ball according to claim 4, wherein said layer comprises a blend of at least one thermoplastic elastomer and at least one liquid crystalline polymer.

9. The golf ball according to claim 8 wherein said thermoplastic elastomer is selected from block copolymers consisting of copoly(amide-ethers), polyurethanes, and copoly(ester-ethers), and combinations thereof.

10. The golf ball according to claim 1, comprising a core, wherein said layer forms at least a portion of said core.

11. The golf ball according to claim 10, wherein said core comprises a liquid center.

12. The golf ball according to claim 10, wherein said layer has a foamed structure.

13. The golf ball according to claim 10, wherein said liquid crystalline polymer containing material comprises at least one liquid crystalline elastomer.

14. The golf ball according to claim 10 wherein said liquid crystalline polymer containing material comprises a blend of (1) at least one elastomer selected from the group consisting of polybutadiene rubber, styrene-butadiene rubber, synthetic polyisoprene rubber, natural rubber, isoprene-butadiene rubber, isoprene-butadiene-styrene rubber, nitrile rubber, carboxylated nitrile rubber, and EPDM rubber, and (2) at least one thermotropic liquid crystalline polymer containing an aliphatic spacer, wherein said thermotropic liquid crystalline polymer exhibits no apparent crystalline to nematic transition, wherein said thermotropic liquid crystalline polymer exhibits nematic order above a glass transition temperature, wherein said glass transition temperature of said thermotropic liquid crystalline polymer is within the range of 20° C. to 180° C. and wherein said thermotropic liquid crystalline polymer is comprised of repeat units which are derived from a halogenated hydroquinone, para-hydroxybenzoic acid, and an aliphatic dicarboxylic acid having the structural formula HOOC—[CH$_2$]—$_n$COOH wherein n represents an integer from about 4 to about.

15. The golf ball according to claim 13, wherein said elastomer comprises a reaction product of a monomer selected from the group consisting of 2-[4-(4'-cyanophenoxycarbonyl) phenoxy]ethyl acrylate, 4,4'-biphenyldicarboxylic acid, 6-{4-[4'-(6-hydroxy-1-hexoxy) phenyl]phenoxy}-1-hexyl 2-(prop-2-enyl) malonate, 6-{4-[(4'-methoxy) phenoxycarbonyl]phenoxy}-1-hexyl acrylate, 6-{4-[(4'-methoxy) phenoxycarbonyl]phenoxy}-1-hexyl methacrylate, 6-{4-[(4'-cyano)phenoxycarbonyl]phenoxy}-1-hexyl acrylate, 4'-acetoxy-4-[undec-1-en-11-oxy]biphenyl functionalized with N-(5-carboxypentyl) acrylamide, 4'-methoxyphenyl-4-(ω-vinyl-n-butoxy) benzoate, 4'-methoxyphenyl-4-(ω-vinyl-n-pentoxy) benzoate, derivatives of these monomers, and combinations thereof.

16. The golf ball according to claim 10, wherein said core has a diameter of from about 1.0 to about 1.63 inch, and said layer has a thickness of from about 0.005 to about 0.125 inch.

17. The golf ball according to claim 1, further comprising a cover and a core and at least one mantle layer situated between said cover and said core.

18. The golf ball according to claim 17, wherein said core comprises a liquid or solid center wrapped in elastomeric windings.

19. The golf ball according to claim 18, wherein said elastomeric windings comprise a liquid crystalline elastomer.

20. The golf ball according to claim 17, wherein said layer forms at least a portion of said mantle.

21. The golf ball according to claim 20, wherein said core has a diameter of from about 1 to about 1.63 inch, said cover has a thickness of from about 0.005 to about 0.125 inch, and said mantle has a thickness of from about 0.005 to about 0.125 inch.

22. The golf ball according to claim 20, wherein said layer has a foamed structure.

23. The golf ball according to claim 1, wherein said liquid crystalline polymer containing material is selected from the group consisting of a liquid crystalline polyester, a liquid crystalline polysiloxane, a liquid crystalline elastomer, a liquid crystalline ionomer, blends thereof with thermoset or thermoplastic polymers, and combinations thereof.

24. The golf ball according to claim 1, wherein said liquid crystalline polymer containing material comprises a liquid crystalline polyester, and wherein said liquid crystalline polyester comprises a reaction product of a monomer selected from the group consisting of 2,6-naphthalene dicarboxylic acid, 6-hydroxy-2-naphthoic acid, p-acetoxybenzoic acid, p-hydroxybenzoic acid, hydroquinone terephthalate, 2,6-dihydroxynaphthalene 4,4'-biphenyldicarboxylic acid, trans-4,4'-stilbenedicarboxylic acid, 4,4'-dihydroxybiphenyl, terephthalic acid, 4,4"-p-terphenyldicarboxylic acid, p-hydroquinone, derivatives of these monomers, and combinations thereof.

25. The golf ball according to claim 1, wherein said liquid crystalline polymer containing material comprises a liquid crystalline elastomer, and wherein said elastomer comprises a reaction product of a monomer selected from the group consisting of 2-[4-(4'-cyanophenoxycarbonyl)-phenoxy] ethyl acrylate, 4,4'-biphenyldicarboxylic acid, 6-{4-[4'-(6-hydroxy-1-hexoxy)phenyl]phenoxy}-1-hexyl 2-(prop-2-enyl) malonate, 6-{4-[(4'-methoxy)phenoxycarbonyl]phenoxy}-1-hexyl acrylate, 6-{4-[(4'-methoxy)phenoxycarbonyl]phenoxy}-1-hexyl methacrylate, 6-{4-[(4'-cyano)phenoxycarbonyl]phenoxy}-1-hexyl acrylate, 4'-acetoxy-4-[undec-1-en-11-oxy]biphenyl functionalized with N-(5-carboxypentyl) acrylamide, 4'-methoxyphenyl-4-(ω-vinyl-n-butoxy) benzoate, 4'-methoxyphenyl-4-(ω-vinyl-n-pentoxy) benzoate, derivatives of these monomers, and combinations thereof.

26. The golf ball according to claim 1, wherein said liquid crystalline polymer containing material comprises a liquid crystalline ionomer, said liquid crystalline ionomer comprising a reaction product of a monomer selected from the group consisting of 4,4'-Dihydroxy-α,α'-dimethylbenzalazine, Brilliant Yellow, derivatives of these monomers, and combinations thereof.

27. The golf ball according to claim 1, further comprising a cover and a core, wherein said liquid crystalline polymer containing material has a foamed structure.

28. The golf ball according to claim 27, wherein said layer forms at least a portion of said core, and said cover comprises a density increasing filler material.

29. The golf ball according to claim 27, wherein said layer forms at least a portion of said cover, and said core comprises a density increasing filler material.

30. The golf ball according to claim 27, further comprising at least one mantle layer situated between said cover and said core, wherein said layer forms at least a portion of said mantle, and said cover or said core or both said cover and said core comprise a density increasing filler material.

31. A golf ball comprising a cover and a core and a mantle situated between said cover and said core, wherein at least one of said cover, said core, and said mantle comprises at least one layer, said layer formed of a liquid crystalline polymer blend, comprising from about 0.01% to 99.99 wt. % of at least one liquid crystalline polymer and from about 99.99 to 0.01 wt. % of at least one ionomer.

32. The golf ball according to claim 31, wherein said layer has a foamed structure.

33. The golf ball according to claim 1 wherein said liquid crystalline polymer containing material is a liquid crystalline polymer blend and wherein said blend is self-reinforcing.

34. The golf ball according to claim 1 wherein said liquid crystalline polymer containing material has a flexural modulus of between about 5,000 and about 2,000,000 psi.

* * * * *

UNITED STATES PATENT AND TRADEMARK OFFICE
CERTIFICATE OF CORRECTION

PATENT NO. : 5,948,864

DATED : September 7, 1999

INVENTOR(S) : Murali Rajagopalan

It is certified that error appears in the above-identified patent and that said Letters Patent is hereby corrected as shown below:

In claim 14, at line 19, change "HOOC—[CH$_2$]—$_n$COOH"

to --HOOC—[CH$_2$]$_n$—COOH--.

In claim 14, at line 20, after "about" (second occurrence), add --8--.

Signed and Sealed this

Twenty-ninth Day of February, 2000

Attest:

Q. TODD DICKINSON

*Attesting Officer*   *Commissioner of Patents and Trademarks*